(12) United States Patent
Zhang et al.

(10) Patent No.: US 7,042,680 B1
(45) Date of Patent: May 9, 2006

(54) SWAGING-OPTIMIZED BASEPLATE FOR DISK DRIVE HEAD SUSPENSION

(75) Inventors: Yiduo Zhang, Plymouth, MN (US);
Wade A. Linnertz, Chaska, MN (US);
Randolph Edward Fossum, Richfield, MN (US); Shane J. Van Sloun, Waconia, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 148 days.

(21) Appl. No.: 10/686,183

(22) Filed: Oct. 15, 2003

(51) Int. Cl.
*G11B 21/16* (2006.01)

(52) U.S. Cl. .................................. 360/244.6

(58) Field of Classification Search ... 360/244.2–244.6
See application file for complete search history.

(56) References Cited

U.S. PATENT DOCUMENTS

| | | | | |
|---|---|---|---|---|
| 5,461,524 A | * | 10/1995 | Jurgenson | 360/244.6 |
| 5,689,389 A | * | 11/1997 | Braunheim | 360/244.6 |
| 5,717,545 A | * | 2/1998 | Brooks et al. | 360/244.6 |
| 5,796,555 A | * | 8/1998 | Aoyagi et al. | 360/244.6 |
| 5,949,615 A | * | 9/1999 | Hernandez | 360/244.5 |
| 6,033,755 A | * | 3/2000 | Hanrahan et al. | 428/131 |
| 6,046,885 A | * | 4/2000 | Aimonetti et al. | 360/244.6 |
| 6,069,772 A | * | 5/2000 | Braunheim et al. | 360/244.6 |
| 6,183,841 B1 | * | 2/2001 | Hanrahan et al. | 428/132 |
| 6,198,602 B1 | * | 3/2001 | Vera et al. | 360/244.5 |
| 6,372,314 B1 | * | 4/2002 | Schmidt et al. | 428/34.1 |
| 6,417,993 B1 | * | 7/2002 | Kant et al. | 360/244.6 |
| 6,424,497 B1 | * | 7/2002 | Coon | 360/244.6 |
| 6,631,553 B1 | * | 10/2003 | Schmidt et al. | 29/757 |
| 6,850,392 B1 | * | 2/2005 | Wong et al. | 360/244.5 |
| 2002/0051318 A1 | * | 5/2002 | Kant et al. | 360/244.6 |
| 2002/0145830 A1 | * | 10/2002 | Wang et al. | 360/244.6 |
| 2003/0156357 A1 | * | 8/2003 | Brink et al. | 360/244.6 |

OTHER PUBLICATIONS

Hutchinson Technology Inc., *Interlok™ Suspension/Actuator Attachment Applications Guide*, Apr. 1992, pp. 1-29.

* cited by examiner

*Primary Examiner*—Allen Cao
(74) *Attorney, Agent, or Firm*—Faegre & Benson LLP

(57) ABSTRACT

A baseplate for swaging a disk drive head suspension to an arm having a thickness and a neutral axis. The baseplate includes a boss tower having an outer diameter high point configured to be located within about ±6% of the arm thickness from the neutral axis when swaged to an arm.

18 Claims, 4 Drawing Sheets

SWAGING-OPTIMIZED BASEPLATE FOR DISK DRIVE HEAD SUSPENSION

FIELD OF THE INVENTION

The present invention relates generally to attachment structures such as baseplates for disk drive head suspensions.

BACKGROUND OF THE INVENTION

Swage baseplates are widely used in disk drives to attach head suspensions to E-blocks, C-blocks or other actuator arms. Examples of these attachment structures and associated assembly methods are disclosed in the Wang et al. U.S. Patent Application Publication No. 2002/0145830, and the Hanrahan et al. U.S. Pat. Nos. 6,033,755 and 6,183,841, all of which are incorporated herein by reference.

Briefly, baseplates include a generally flat flange and a tubular boss tower extending from the flange. The flange is typically welded to a mounting region of the suspension. The boss tower is sized to fit within an opening in the actuator arm to which the suspension is to be mounted. During the swaging process a ball is forced through the boss tower, thereby forcing the outer surface of the boss tower into frictional engagement with the inner surface of the opening in the actuator arm. The baseplate and attached suspension are thereby securely fastened to the actuator arm. Unfortunately, this swaging process can result in deformation of the actuator arm. This actuator arm deformation can cause changes in the desired positional orientation of the suspension on the actuator arm, known as z-height variations, and changes to the desired spring characteristics of the suspension, known as gram changes. Z-height changes depend to some degree on suspension parameters such as spring rate and effective length, but by way of example, changes in the range of 0.005–0.015 mm have been observed in suspensions having a 20 N/m spring rate. Also by way of example, gram load changes in the range of 0.1–0.3 gram and have been observed. These swaging-induced z-height variations and gram changes can detrimentally affect the operational performance of the suspensions. These problems have been observed to be especially prevalent in arms, typically at the ends of a multi-arm stack, having only one suspension swaged thereto.

There is, therefore, a continuing need for disk drive suspension structures and assembly methods that minimize z-height variations and gram changes. Baseplates that contribute to these objectives by minimizing swaging-induced deformation to actuator arms during the swaging process would be especially desirable.

SUMMARY OF THE INVENTION

The present invention is a baseplate for swaging a disk drive head suspension to an actuator arm having a thickness and a neutral axis. The baseplate includes a boss tower having an outer diameter high point configured to be located within about ±6% of the arm thickness from the neutral axis when swaged to an arm. The baseplate is optimized to produce relatively little actuator arm deformation during the swaging process. Gram changes, z-height variations and other detrimental consequences of the arm deformation are thereby reduced.

DETAILED DESCRIPTION OF THE PREFERRED EMBODIMENTS

Figure 1:
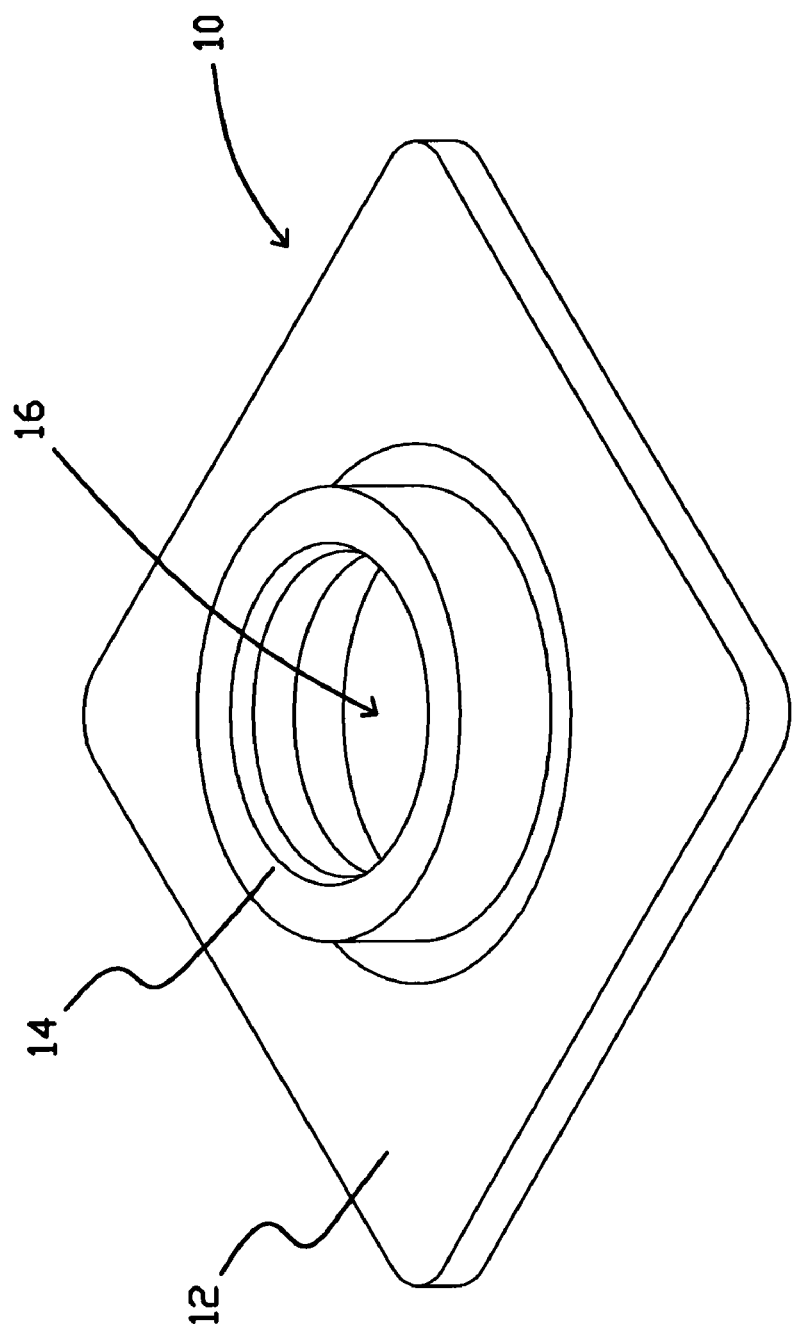
FIG. 1 is an illustration of a baseplate in accordance with the present invention.

FIG. 1 is an illustration of a baseplate 10 that can be configured in accordance with the present invention to produce relatively little or minimal swaging-induced deformation in an actuator arm to which it is swaged. As shown, baseplate 10 includes a generally flat flange 12 and a tubular boss tower 14 that extends from the flange and surrounds a swaging hole 16. Baseplates such as 10 are typically manufactured from stainless steel by stamping processes, although other materials and manufacturing methods can also be used.

Figure 2:
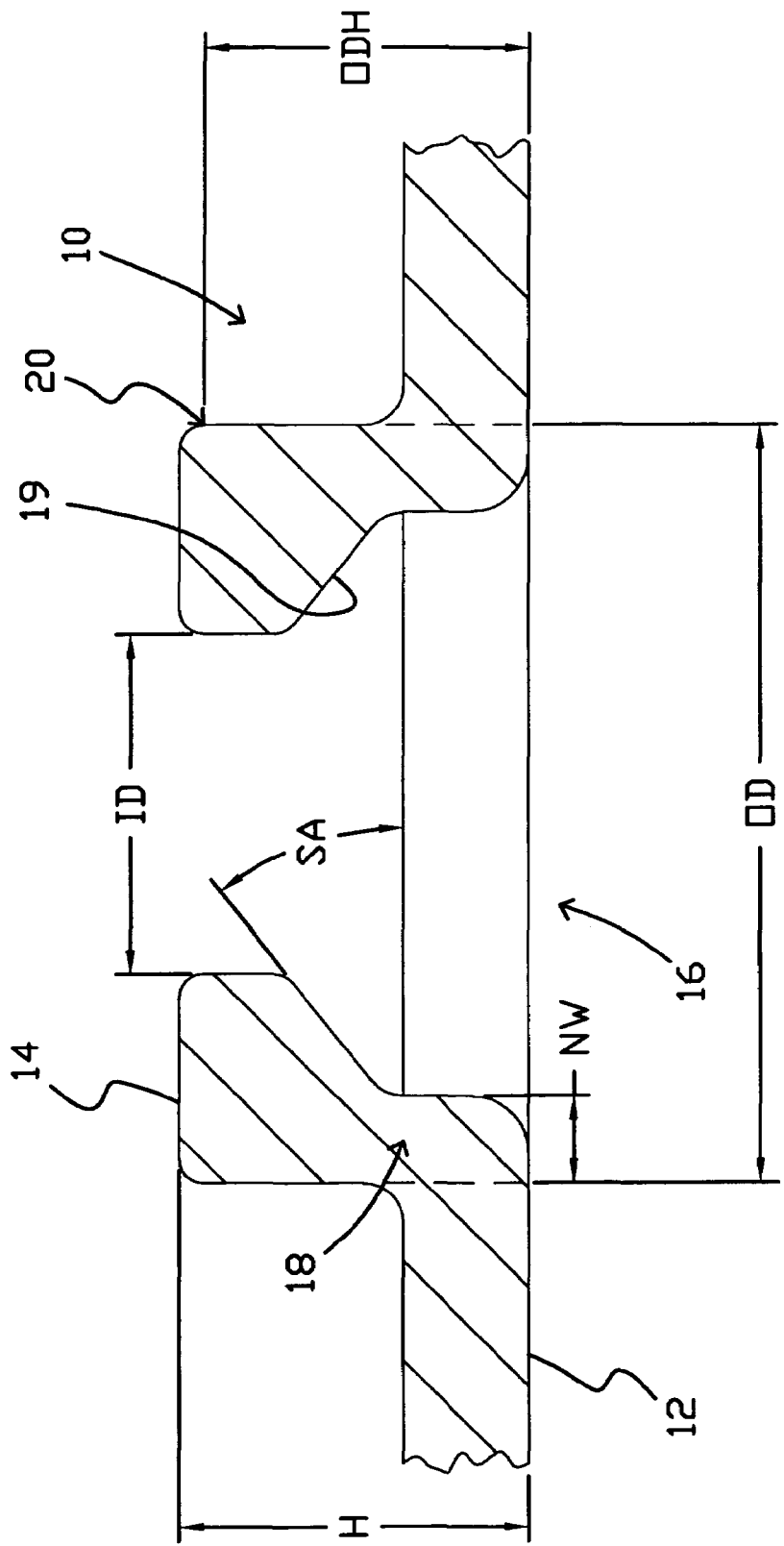
FIG. 2 is a detailed cross sectional view of the baseplate shown in FIG. 1.

FIG. 2 is a cross sectional illustration of the baseplate 10 with the boss tower 14 shown in greater detail. As shown, the tower 14 includes a neck 18 and generally increases in cross sectional dimension (into the hole 16) with increasing distance from the flange 12. The tower 14 has a width NW at the neck 18. The cross sectional dimension of the tower increases at a stamping angle SA. In the illustrated embodiment the angled surface 19 of the tower 14 intersects neck 18 at the level of flange 12. In other embodiments (not shown) the surface 19 of the tower 14 intersects neck 18 at levels above and below the surface of the flange 12. The end of the tower 14 opposite the flange 12 has an inner diameter ID. The height H of the tower 14 is shown as being measured from the surface of the flange 12 opposite the side of the flange from which the tower extends. OD is the outer diameter of the tower 14. The OD high point 20 is the location of the region on the outer surface of the tower 14 at the outer diameter OD that is furthest from the flange 12. The outer diameter height ODH is the distance of the OD high point 20 from the surface of the flange 12 from which the tower 14 extends.

Figure 3:
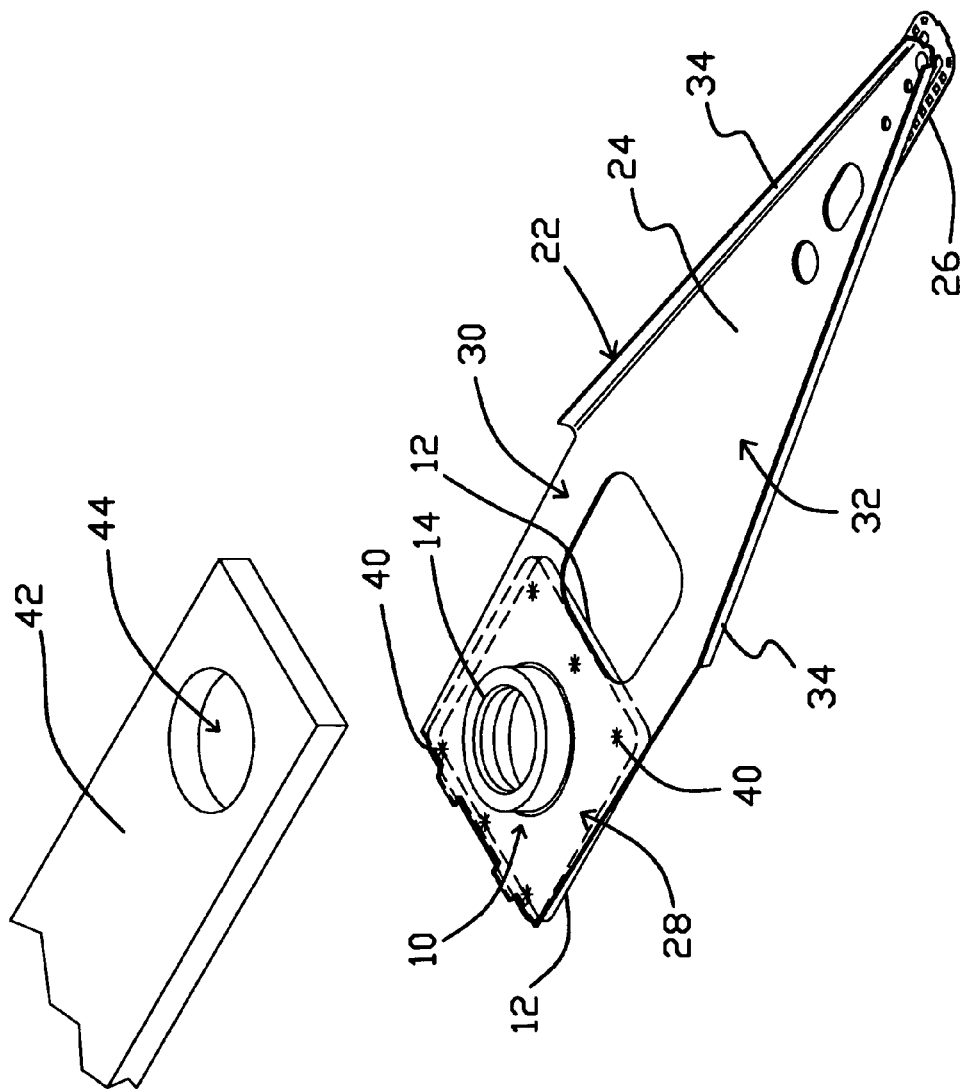
FIG. 3 is an exploded view of a suspension including the baseplate shown in FIG. 1 mounted, and an actuator arm in accordance with the present invention to which the suspension can be swaged.

FIG. 3 is an illustration of a disk drive head suspension 22 that includes a baseplate 10, load beam 24 and flexure 26. The invention can be used in connection with any suitable conventional or otherwise known load beam 24 and flexure 26. Load beams 24 and flexures 26 are well known. Load beams such as 24 can be manufactured from stainless steel using etching and forming processes, and typically include a mounting region 28 on a distal end, a radius or spring region 30 and a beam or rigid region 32. Rails 34 can be formed in the side of the rigid region 32. The flexure 26, which can be an integrated lead or wireless flexure, is mounted to the distal end of the load beam 24 in the illustrated embodiment. In other embodiments (not shown), the flexure is formed as an integral element in the distal end of the load beam. The baseplate 10 is attached to a mounting region 28 of the load beam, typically by welds 40.

FIG. 3 also shows an actuator arm 42 to which the suspension 22 can be attached. Arms such as 42 are well known. By way of example, arm 42 can be the arm portion of an E-block or C-block, or a separate arm element stamped or otherwise formed from aluminum, stainless steel or other materials. As shown, the arm 42 includes a hole 44 into which the boss tower 14 of suspension 22 is inserted and swaged.

Figure 4:
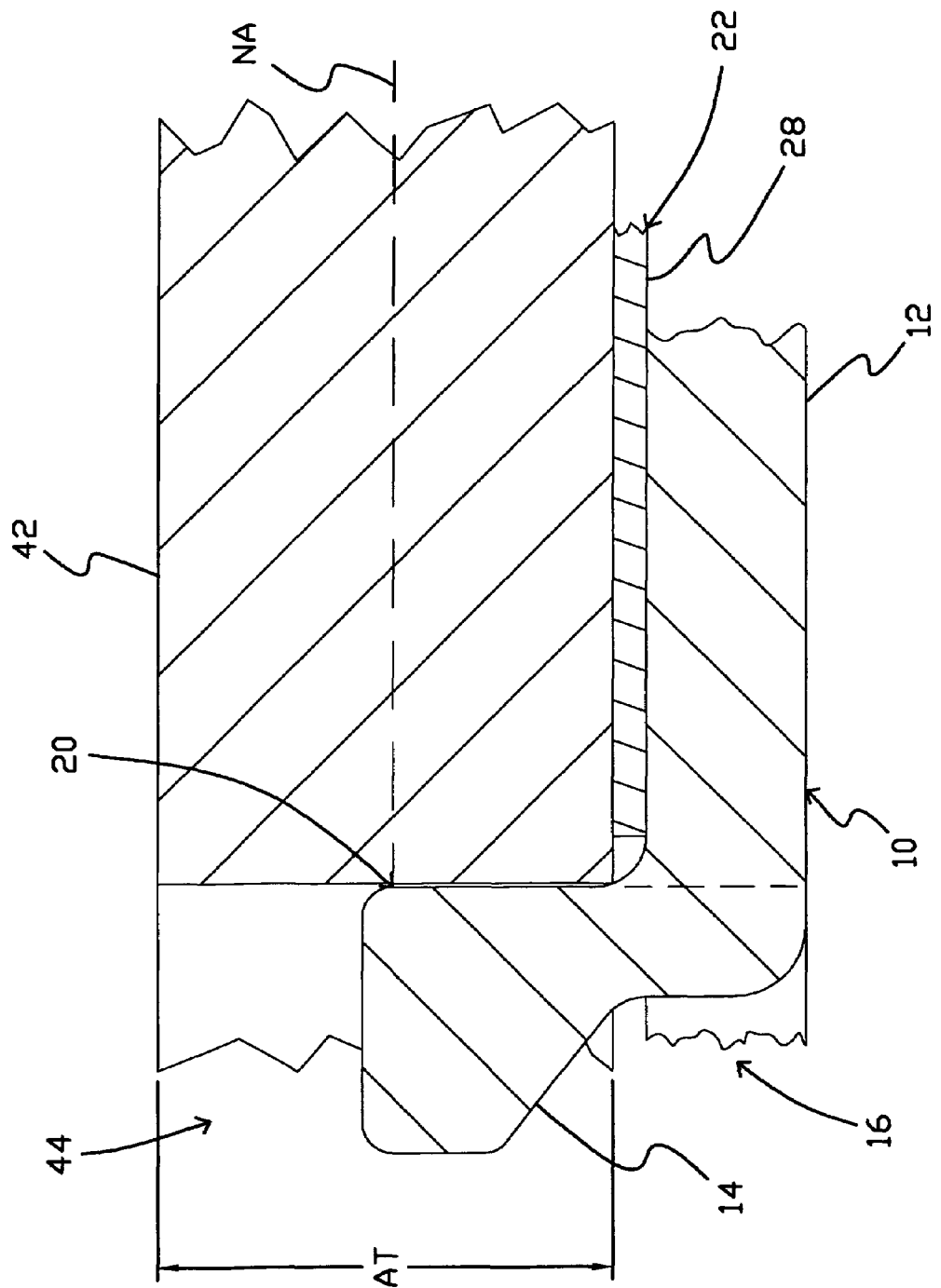
FIG. 4 is a detailed cross sectional view of the swaged suspension and actuator arm shown in FIG. 3.

FIG. 4 is a detailed cross sectional illustration of a baseplate 10 in accordance with the present invention after it has been swaged to actuator arm 42. The actuator arm 42 has an arm thickness AT and a neutral axis NA. If the thickness of the arm 42 in the region where it is mounted to the suspension 22 is constant and of homogeneous material, the neutral axis NA will generally be near the center of the arm. However, in other embodiments the arm 42 is constructed from layers of different materials. These and other arm constructions can have a neutral axis that is spaced from the center of arm thickness AT. The thickness AT of conventional arms 42 can range between 0.78 and 1.44 mm. However, it is anticipated that the thickness of arms 42 will decrease with continuing developments in arm, baseplate and suspension technology.

Baseplate 10 in accordance with the present invention has an OD high point 20 that is located within about ±6% of the actuator arm thickness AT from the neutral axis NA of the arm 42 when the suspension 22 is swaged to the arm. By way of example, for arms 42 having thicknesses AT of 0.78 mm and 1.44 mm, baseplates 10 in accordance with the present invention will have outer diameter heights OHD of between about 0.343 mm and 0.437 mm (i.e., 0.39±0.047 mm) and 0.634 mm and 0.806 mm (i.e., 0.72±0.086 mm), respectively. In a preferred embodiment of the invention, the baseplate 10 has an OD high point 20 that is located within about ±4% of the arm thickness AT from the neutral axis NA of the arm 42 when the suspension 22 is swaged to the arm. By way of example, for arms 42 having thicknesses AT of 0.78 mm and 1.44 mm, baseplates 10 in accordance with the present invention will have outer diameter heights OHD of between about 0.359 mm and 0.421 mm (i.e., 0.39±0.031 mm) and 0.662 mm and 0.778 mm (i.e., 0.72±0.058 mm), respectively. In a most preferred embodiment of the invention, the baseplate 10 has an OD high point 20 that is located within about ±2% of the arm thickness AT from the neutral axis NA of the arm 42 when the suspension 22 is swaged to the arm. By way of example, for arms 42 having thicknesses AT of 0.78 mm and 1.44 mm, baseplates 10 in accordance with the present invention will have outer diameter heights OHD of between about 0.374 mm and 0.406 mm (i.e., 0.39±0.016 mm) and 0.691 mm and 0.749 mm (i.e., 0.72±0.029 mm), respectively.

Baseplates 10, or baseplates in combination with arms 42, when constructed in accordance with the present invention, offer significant improvements. Locating the OD high point OD near the neutral axis NA of the arm 42 has been found to significantly reduce the amount of arm deformation that occurs when the baseplate 10 is swaged to the arm. This reduced arm deformation results in significantly lower amounts of swaging-induced gram change. Finite element analysis has demonstrated gram change reductions in the range of 50% to 100%. Suspension resonance performance will benefit. The amount of z-height changes induced into the arm 42 by swaging can also be reduced. These benefits are especially pronounced in baseplate 10 and arm 42 combinations having only one suspension 22 mounted to the arm. The invention can also be used in connection with baseplates that are swaged in either the tension or compression direction. The baseplate can also be mounted to either side of the load beam 24. Furthermore, although described as a separate component that is attached to a load beam, an attachment structure having a boss tower in accordance with the invention could be integrally formed on the distal mounting region of the load beam itself.

Although the present invention has been described with reference to preferred embodiments, those skilled in the art will recognize that changes can be made in form and detail without departing from the spirit and scope of the invention. In particular, although described in connection with a one-piece baseplate, the invention can also be incorporated into multi-piece baseplates.

What is claimed is:

1. A baseplate for swaging a disk drive head suspension to an arm having a thickness and a neutral axis, the baseplate including a boss tower having an outer diameter high point configured to be located within about ±6% of the arm thickness from the neutral axis when swaged to an arm.

2. The baseplate of claim 1 and further including the arm, and the baseplate is swaged to the arm.

3. The invention of claim 2 wherein the baseplate is the sole baseplate swaged to the arm.

4. The invention of claim 2 wherein the outer diameter high point of the baseplate is located within about ±6% of the center of the arm thickness.

5. A baseplate for swaging a disk drive head suspension to an arm having a thickness and a neutral axis, the baseplate including a boss tower having an outer diameter high point configured to be located within about ±4% of the arm thickness from the neutral axis when swaged to an arm.

6. The baseplate of claim 5 and further including the arm, and the baseplate is swaged to the arm.

7. The invention of claim 5 wherein the baseplate is the sole baseplate swaged to the arm.

8. The invention of claim 6 wherein the outer diameter high point of the baseplate is located within about ±4% of the center of the arm thickness.

9. A baseplate for swaging a disk drive head suspension to an arm having a thickness and a neutral axis, the baseplate including a boss tower having an outer diameter high point configured to be located within about ±2% of the arm thickness from the neutral axis when swaged to an arm.

10. The baseplate of claim 9 and further including the arm, and the baseplate is swaged to the arm.

11. The invention of claim 10 wherein the baseplate is the sole baseplate swaged to the arm.

12. The invention of claim 10 wherein the outer diameter high point of the baseplate is located within about ±2% of the center of the arm thickness.

13. An attachment structure for swaging a disk drive head suspension to an arm having a thickness and a neutral axis, the attachment structure including a boss tower having an outer diameter high point configured to be located within about ±6% of the arm thickness from the neutral axis when swaged to an arm.

14. The attachment structure of claim 13 and further including the arm, and the boss tower is swaged to the arm.

15. The invention of claim 14 wherein the attachment structure is the sole attachment structure swaged to the arm.

16. The invention of claim 14 wherein the outer diameter high point of the boss tower is located within about ±6% of the center of the arm thickness.

17. An attachment structure for swaging a disk drive head suspension to an arm having a thickness and a neutral axis, the attachment structure including a boss tower having an outer diameter high point configured to be located within about ±4% of the arm thickness from the neutral axis when swaged to an arm.

18. The attachment structure of claim 17 and further including the arm, and the boss tower is swaged to the arm.

* * * * *